(12) United States Patent
Gordon et al.

(10) Patent No.: US 6,270,550 B1
(45) Date of Patent: Aug. 7, 2001

(54) METHOD FOR DIRECT REDUCTION OF IRON BEARING PELLETS OR LUMP IRON ORE

(75) Inventors: Iakov Gordon, North York (CA); Michael Blank, Modi'in (IL)

(73) Assignee: Hatch Associates Ltd., Mississauga (CA)

( * ) Notice: Subject to any disclaimer, the term of this patent is extended or adjusted under 35 U.S.C. 154(b) by 0 days.

(21) Appl. No.: 09/365,410

(22) Filed: Aug. 2, 1999

(30) Foreign Application Priority Data

Aug. 3, 1998 (GB) .................................................. 9816887

(51) Int. Cl.$^7$ .................................................. C21B 13/02
(52) U.S. Cl. .................................. 75/380; 75/387; 75/490
(58) Field of Search ............................. 75/490, 496, 380, 75/387

(56) References Cited

U.S. PATENT DOCUMENTS

| 4,179,282 | 12/1979 | Rubio . |
| 4,834,792 | 5/1989 | Becerra-Novoa . |
| 5,064,467 | 11/1991 | Dam G. et al. . |

FOREIGN PATENT DOCUMENTS

| 739120 | 6/1980 | (SU) . | |
| 173 18 22 | * 5/1992 | (SU) | .................................. 75/490 |
| 1756362 | * 8/1992 | (SU) | .................................. 75/496 |

* cited by examiner

Primary Examiner—Melvyn Andrews
(74) Attorney, Agent, or Firm—Shlesinger, Arkwright & Garvey LLP

(57) ABSTRACT

A method for effecting direct reduction of iron oxides in the form of lumps or pellets, in which an ore burden is passed downwardly successively through prereduction and metallization zones of a shaft furnace while passing a flow of rich fuel gas produced by external partial combustion upwardly in counter current through the prereduction zone, and passing a flow of reducing gas in cocurrent though the metallization zone. The flow of reducing gas is an independent flow that has not been subject to external combustion, and an intermediate zone is provided forming a narrowed throat between the prereduction and metallization zones. The reducing gas is introduced at a boundary between the intermediate and metallization zones, such that passage of rich fuel gas from the prereduction zone to the metallization zone is inhibited. The gas flows should be controlled so that about 5% to 10% of the volume of reducing gas passes upwardly from the intermediate zone to the prereduction zone.

9 Claims, 1 Drawing Sheet

METHOD FOR DIRECT REDUCTION OF IRON BEARING PELLETS OR LUMP IRON ORE

Figure 2:
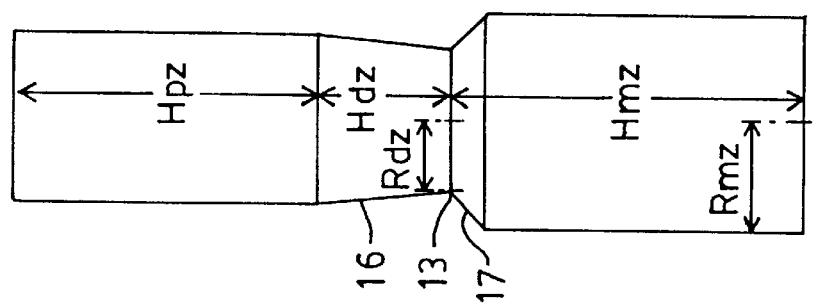

This invention relates to the direct reduction of pelletized iron concentrates or lump iron ore in a shaft furnace using a reducing gas.

Known and industrially proven technologies for such direct reduction utilize countercurrent flow of charge materials and reducing gas, and utilize external reformers or gasifiers and sulfur cleaning equipment to produce the reducing gas. This equipment is expensive and requires special catalysts, typically nickel based, for its operation, and thus has significant impact on the economics of the operation.

Attempts have accordingly been made to eliminate such external reforming equipment from the direct reduction process by effecting reforming within the furnace itself, with iron from the charge itself acting as a catalyst.

The concept of the countercurrent AREX (trademark) shaft furnace process as described in U.S. Pat. No. 5,064,467, is to partially oxidize a mixture of natural gas and process gas in a single pass through the system. Preheated streams of a mixture of recycled and natural gas, and oxygen enriched air, are mixed in an external combustion chamber and partially react there. During the conversion of natural gas by enriched air, heat and reducing gas are produced and the products of partial combustion exit the chamber with a temperature about 1000–1100° C. This gas is injected to the reforming zone of the shaft furnace where the reforming reactions occur by the catalytic action of the metallic iron component of the hot direct reduced iron that is present. The reducing process gas which is generated passes in countercurrent through the charge for the preheating and reduction of the iron oxides which are being fed down through the shaft furnace.

Difficulties which may occur with this process are:

a) the likelihood of burden material softening and sticking in the shaft since the reducing gas entering the metallization zone is at high temperature;

b) lower product quality (due to sticking) and difficulties in controlling the carbon content in the iron produced;

c) the increase (in comparison with conventional processes) of the volume of reducing gas used in the process due to lower concentration of reducing agents (CO and $H_2$);

d) the increase (in comparison with conventional processes) of reducing gas volume due to the necessity to compensate for the heat of natural gas conversion in metallization zone.

A method for virgin iron production described in Russian Patent No. 739120 utilizes the concept of natural gas self reforming in the metallization zone without preliminary partial oxidation.

In this process, prereduction and even partial metallization (up to 40–60% metallization) is carried out in a prereduction zone in flow of a rich fuel gas produced in external burners in which the air consumed is about 0.3–0.5 of stoichiometric value. Final metallization occurs in a metallization zone in cocurrent flow with a preheated (up to 600–800° C.) mixture of natural gas and recycled gas. The material temperature in this zone drops from 900–1000° C. to 700° C.

Disadvantages of this process are:

a) the necessity to incorporate a carbon monoxide remover to remove carbon monoxide from the recycled gas since a significant amount of this gas is created during the process by reactions of water vapour with carbon and carbon dioxide with carbon. This also increases the total reducing gas volume entering the metallization zone;

b) rich fuel gas flows from the prereduction zone to the final metallization zone, which decreases the reduction potential of the reducing gas and requires a greater gas volume;

c) gas losses occur from the prereduction zone which cause an increased requirement for reducing gas for metallization;

d) no means is disclosed to control the carbon content in the final product.

These difficulties with prior art techniques for direct reduction in shaft furnaces with natural gas self reforming in the metallization zone are believed to render such processes non-competitive compared with conventional processes using external reforming of natural gas. Reduction of fuel usage and recycled gas volume for the metallization step in known processes using natural gas reforming in the metallization zone is difficult because of resulting lack of heat in the metallization zone and lowering of the quality of the iron produced, the significant volume of carbon monoxide produced, losses of reducing gas to the prereduction zone, and passage of rich gas to the metallization zone.

The present invention provides a method for effecting direct reduction of iron oxides in the form of lumps or pellets, comprising passing an ore burden downwardly successively through prereduction and metallization zones of a shaft furnace while passing a flow of rich fuel gas produced by external partial combustion upwardly in counter current through the prereduction zone, and passing a flow of reducing gas in cocurrent through the metallization zone in an independent flow that has not been subject to external combustion, wherein an intermediate zone is provided forming a narrowed throat between the prereduction and metallization zones, and wherein the reducing gas is at a boundary between the intermediate and metallization zones, whereby passage of rich fuel gas from the prereduction zone to the metallization zone is inhibited.

Figure 1:
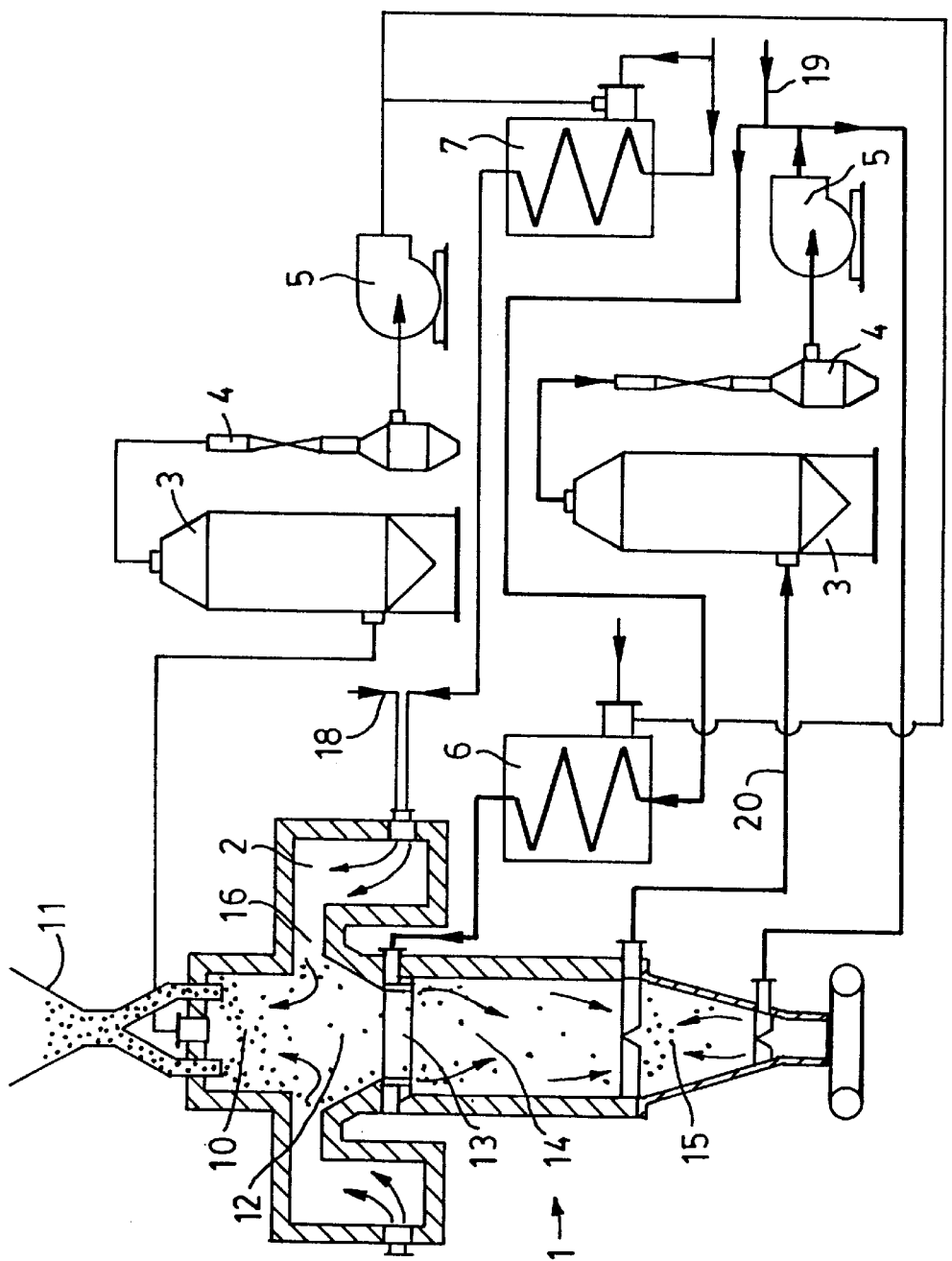

Further features of the invention are set forth in the appended claims and described with reference to the accompanying drawings, in which:

FIG. 1 is a process flow diagram of an embodiment of the method of the invention; and FIG. 2 graphically illustrates the profile of the shaft of a furnace suitable for effecting the method of the invention.

Referring to FIG. 1, this shows a vertical shaft furnace and ancillary equipment, suitable for implementing the method of the invention. The shaft of the furnace 1 is divided into four zones, a prereduction zone 10 into which a charge formed pellets or lumps of ore is fed from a hopper 11, an intermediate zone 12 defining a throat 13, a metallization zone 14, and a cooling zone 15. As best seen in FIG. 2, the intermediate zone 12 is defined by two conical frusta 16 and 17 meeting at their narrow ends at the throat 13, and diverging to connections with the zones 10 and 14. The angle of the frustum 16 to the horizontal is greater than the angle of repose of the charge. The zone 10 receives rich fuel gas from the combustion chamber of an external burner 2, which receives methane ($CH_4$) or natural gas from a connection 18 and preheated air from a preheater 7. The rich fuel gas flows upwardly through zone 10 in countercurrent to the pellets or ore lumps and is discharged for processing by a scrubber 3 and venturi tube 4 with the flow controlled by a blower 5. The gas, with the addition of additional natural gas as necessary and additional combustion air, is used to heat the air preheater 7, and also a process gas preheater 6 used to preheat process gas delivered to the top of the metallization zone 14 for passage downwardly in co-current with the furnace charge through the metallization zone, at the bottom of which the gas is discharged through line 20 for processing by a scrubber 3 and venturi tube 4 by a blower 5, whence the gas is recycled, with the addition as necessary of methane or natural gas from line 19, to the preheater 6. Recycled gas is also passed to the cooling zone 15 for passage in countercurrent to the charge to the discharge line 20.

The preheating and prereduction zone 10 operates the same way as described above with reference to the process of Russian Patent 739120. The charge is prereduced up to 45–55% and preheated to 900–1000° C., and enters the metallization zone 14 through the intermediate zone 12. The off-gas from the furnace passes through the cleaning system 3,4 and is used for air and gas preheating as described.

The process of metallization in the metallization zone occurs in cocurrent flow with the reducing gas which is preheated up to 700–950° C., typically about 850° C. The reducing gas is a mixture of 20–25% natural gas, 40–50% of hydrogen and 20–30% of carbon monoxide (the balance is water vapour, carbon dioxide and nitrogen). Reducing gas entering the zone 12 is divided into two flows in a ratio of about (0.05–0.1)/0.9–0.95). The smaller flow passes upwardly through the intermediate zone 12 and enters the prereduction zone 10. The greater flow passes downwardly through the metallization zone 14 of the furnace. The ratio between these two flows is determined by the volume of natural gas added to the reducing gas mixture through line 19 to maintain metallization and to replace the gas passing to the intermediate and prereduction zones. This division of flow in combination with the design of the intermediate zone inhibits the flow of rich fuel gas (containing oxides and nitrogen) from the prereduction zone to the metallization zone. It also provides heat exchange and metallization in the intermediate zone 12.

Hydrogen for reduction is produced in a natural gas self-reforming process on the surface of freshly reduced iron in the metallization zone. Carbon monoxide for reduction is a product of water vapour reaction with carbon from the natural gas or Boudouard reaction of carbon dioxide with carbon from the natural gas. The natural gas volume depends on the required extent of metallization. The materials and gases leave the metallization zone with a temperature of about 600–700° C. After cleaning, cooling and drying, recycled gas is split as described into two flows. The first flow is mixed with the additional natural gas and after preheating, enters the metallization zone. The second flow passes through the cooling zone to cool the reduced iron to a temperature of about 50–60 C.

The carbon content in the direct reduced iron can be controlled in a range of about 0.5–5% by weight, with a typical carbon content of about 1.5–2%. The carbon content is a function of the process parameters. The carbon content can be adjusted by changing the natural gas volume in the reducing gas and the reducing gas temperature. To reach the upper level of carbon content in a final product it is necessary to increase the natural gas volume in the gas by 5–10% in comparison with that providing typical carbon content, with a simultaneous increase of reducing gas temperature to 850–950° C. To decrease the carbon content in the final product to the lowest level it is necessary to decrease the natural gas volume by 5–10%, with a simultaneous decrease of reducing gas temperature to 700–750 C.

As best seen in FIG. 2, the autonomous operation of the metallization and prereduction zones is assisted by the design of the intermediate zone 12. The height of the dividing zone ($H_{dz}$) is preferably about 0.4–0.6 of the radius of the metallization zone radius ($R_{mz}$) and the radius of the throat 13 ($R_{dz}$) is preferably about 0.8–0.9 of the metallization zone radius. The heights ($H_{mz}$ and $H_{pz}$) of the metallization and prereduction zone are preferably in the ratio of about 1:1.1 to 1:1.15. This ratio is proportionally decreased with increase of the reducing gas flow to dividing and prereduction zones.

We claim:

1. A method for effecting direct reduction of iron oxides in the form of lumps or pellets, comprising passing an ore burden downwardly successively through prereduction and metallization zones of a shaft furnace while passing a flow of rich fuel gas produced by external partial combustion upwardly in counter current through the prereduction zone, and passing a flow of reducing gas in cocurrent though the metallization zone; wherein the flow of reducing gas is an independent flow that has not been subject to external combustion, wherein an intermediate zone is provided forming a narrowed throat between the prereduction and metallization zones, and wherein the reducing gas is at a boundary between the intermediate and metallization zones, whereby passage of rich fuel gas from the prereduction zone to the metallization zone is inhibited;

wherein the intermediate zone is of venturi shape with transitions to a throat formed by conical frusta having their narrow ends connected at the throat and their broad ends connected to the prereduction and metallization zones respectively, the reducing gas flow being introduced at the throat.

2. A method according to claim 1, wherein the gas flows are controlled so that about 5% to 10% of the volume of reducing gas passes upwardly from the intermediate zone to the prereduction zone.

3. A method according to claim 1, wherein the rich fuel gas is formed externally by burning natural gas in oxygen-enriched air in an amount about 30% to 50% of the stoichiometric amount required for complete combustion, and is provided at a rate such as to prereduce the burden in the prereduction zone by about 45% to 50% and preheat it to about 900°–1000° C.

4. A method according to claim 1, wherein the heights of the metallization and prereduction zones are in the ratio of about 1.1–1.15:1, the height of the intermediate zone is about 0.4 to 0.6 of the metallization zone radius, the radius of the throat is about 0.8 to 0.9 of the metallization zone radius, and the angle of the wall of the upper frustum is greater than the angle of repose of the burden.

5. A method according to claim 1, wherein the reducing gas is recycled through the metallization zone, with a part of the gas being cycled without reheating in counter current through a cooling zone beneath the metallization zone in counter current to the burden to cool the latter.

6. A method for effecting direct reduction of iron oxides in the form of lumps or pellets, comprising passing an ore burden downwardly successively through prereduction and metallization zones of a shaft furnace while passing a flow of rich fuel gas produced by external partial combustion upwardly in counter current through the prereduction zone, and passing a flow of reducing gas in cocurrent though the metallization zone; wherein the flow of reducing gas is an independent flow that has not been subject to external combustion, wherein an intermediate zone is provided forming a narrowed throat between the prereduction and metallization zones, and wherein the reducing gas is at a boundary between the intermediate and metallization zones, whereby passage of rich fuel gas from the prereduction zone to the metallization zone is inhibited;

wherein the reducing gas is a mixture of abut 20–25% natural gas, about 40% to 50% hydrogen, and about 20% to 30% carbon monoxide, balance being water vapour, carbon dioxide and nitrogen, preheated to about 700° C. to 950° C.; and wherein the carbon content of the reduced iron provided by the process is controlled by adjusting the natural gas content and temperature of the reducing gas, the natural gas content and the temperature being adjusted upwardly to increase carbon content, and the natural gas content and the temperature being decreased to decrease carbon content.

7. A method according to claim 6, wherein the gas flows are controlled so that about 5% to 10% of the volume of reducing gas passes upwardly from the intermediate zone to the prereduction zone.

8. A method according to claim 6, wherein the rich fuel gas is formed externally by burning natural gas in oxygen-enriched air in an amount about 30% to 50% of the stoichiometric amount required for complete combustion, and is provided at a rate such as to prereduce the burden in the prereduction zone by about 45% to 50% and preheat it to about 900°–1000° C.

9. A method according to claim 6, wherein the reducing gas is recycled through the metallization zone, with a part of the gas being cycled without reheating in counter current through a cooling zone beneath the metallization zone in counter current to the burden to cool the latter.

* * * * *